(12) United States Patent
Chasin

(10) Patent No.: US 11,263,591 B2
(45) Date of Patent: *Mar. 1, 2022

(54) METHOD AND SYSTEM FOR CENTRALIZED CONTACT MANAGEMENT

(71) Applicant: McAfee, LLC, San Jose, CA (US)

(72) Inventor: C. Scott Chasin, Denver, CO (US)

(73) Assignee: McAfee, LLC, San Jose, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/434,506

(22) Filed: Jun. 7, 2019

(65) Prior Publication Data

US 2019/0362316 A1    Nov. 28, 2019

Related U.S. Application Data

(63) Continuation of application No. 12/185,517, filed on Aug. 4, 2008, now Pat. No. 10,354,229.

(51) Int. Cl.
*G06F 15/16* (2006.01)
*G06Q 10/10* (2012.01)
*H04L 51/00* (2022.01)

(52) U.S. Cl.
CPC ......... *G06Q 10/109* (2013.01); *G06Q 10/107* (2013.01); *H04L 51/00* (2013.01)

(58) Field of Classification Search
CPC ..... G06Q 10/109; G06Q 10/107; H04L 51/00
See application file for complete search history.

(56) References Cited

U.S. PATENT DOCUMENTS 4,771,400 A   9/1988 Omura et al.
4,868,376 A   9/1989 Lessin et al.
(Continued)

OTHER PUBLICATIONS

European Patent Office Communication Pursuant to Article 94(3) EPC (Examination Report) in EP Application Serial No. 06789864.3 dated Apr. 17, 2018, 6 pages.
(Continued)

*Primary Examiner* — Oleg Survillo
(74) *Attorney, Agent, or Firm* — Patent Capital Group

(57) ABSTRACT

Disclosed is a method and system for managing contacts for a communication system by storing contact information in a centralized storage system and permitting receiving users to access the centralized contact information storage system using a token passed with communications from a sending user. The communications system may be a trusted network with trusted sending and receiving members. Each communications system member provides contact information the member may wish to make available to other parties. The member may also create a policy defining which contact information may be made available to different classes of users. A member of the communications system generates a message to send to a receiving user. A token that identifies the sending user to the communications system is embedded into the message to be sent to the receiving user. The receiving user, after identifying the message as a message containing a token, may request contact information for the sending user from the communications system using the token identifying the sending user to the communication system. The communication system delivers a subset of the sending user's contact information to the receiving user based on the sending user's contact information and policy definitions stored in the centralized contact information storage system of the communication systems. The system and method are especially adaptable to e-mail communications, but other forms of electronic communications may also be included in an embodiment, either solely or in combination.

20 Claims, 6 Drawing Sheets

100  EMBODIMENT OF A CENTRALIZED CONTACT MANAGEMENT SYSTEM FOR A TRUSTED NETWORK E-MAIL SYSTEM

(56) References Cited

U.S. PATENT DOCUMENTS

| | | |
|---|---|---|
| 4,932,054 A | 6/1990 | Chou et al. |
| 4,967,389 A | 10/1990 | Omura et al. |
| 4,972,474 A | 11/1990 | Sabin |
| 5,081,676 A | 1/1992 | Chou et al. |
| 5,210,710 A | 5/1993 | Omura |
| 5,222,133 A | 6/1993 | Chou et al. |
| 5,337,357 A | 8/1994 | Chou et al. |
| 5,546,463 A | 8/1996 | Caputo et al. |
| 5,627,764 A | 5/1997 | Schutzman et al. |
| 5,638,444 A | 6/1997 | Chou et al. |
| 5,704,008 A | 12/1997 | Duvall, Jr. |
| 5,737,424 A | 4/1998 | Elteto et al. |
| 5,778,071 A | 7/1998 | Caputo et al. |
| 5,790,790 A | 8/1998 | Smith et al. |
| 5,796,833 A | 8/1998 | Chen et al. |
| 5,826,011 A | 10/1998 | Chou et al. |
| 5,878,142 A | 3/1999 | Caputo et al. |
| 5,884,033 A | 3/1999 | Duvall et al. |
| 5,937,161 A | 8/1999 | Mulligan et al. |
| 5,937,162 A | 8/1999 | Funk et al. |
| 5,987,610 A | 11/1999 | Franczek et al. |
| 5,996,077 A | 11/1999 | Williams |
| 6,003,027 A | 12/1999 | Prager |
| 6,005,940 A | 12/1999 | Kulinets |
| 6,021,438 A | 2/2000 | Duvvoori et al. |
| 6,052,709 A | 4/2000 | Paul |
| 6,061,448 A | 5/2000 | Smith et al. |
| 6,073,142 A | 6/2000 | Geiger et al. |
| 6,119,137 A | 9/2000 | Smith et al. |
| 6,128,741 A | 10/2000 | Goetz et al. |
| 6,141,686 A | 10/2000 | Jackowski et al. |
| 6,151,675 A | 11/2000 | Smith |
| 6,161,130 A | 12/2000 | Horvitz et al. |
| 6,167,136 A | 12/2000 | Chou |
| 6,192,360 B1 | 2/2001 | Dumais et al. |
| 6,192,407 B1 | 2/2001 | Smith et al. |
| 6,195,425 B1 | 2/2001 | Farris |
| 6,240,436 B1 | 5/2001 | McGregor |
| 6,249,805 B1 | 6/2001 | Fleming, III |
| 6,266,692 B1 | 7/2001 | Greenstein |
| 6,278,782 B1 | 8/2001 | Ober et al. |
| 6,282,290 B1 | 8/2001 | Powell et al. |
| 6,282,657 B1 | 8/2001 | Kaplan et al. |
| 6,307,936 B1 | 10/2001 | Ober et al. |
| 6,321,267 B1 | 11/2001 | Donaldson |
| 6,381,634 B1 | 4/2002 | Tello et al. |
| 6,385,655 B1 | 5/2002 | Smith et al. |
| 6,389,455 B1 | 5/2002 | Fuisz |
| 6,393,465 B2 | 5/2002 | Leeds |
| 6,397,331 B1 | 5/2002 | Ober et al. |
| 6,400,810 B1 | 6/2002 | Skladman et al. |
| 6,412,069 B1 | 6/2002 | Kavsan |
| 6,421,709 B1 | 7/2002 | McCormick et al. |
| 6,434,585 B2 | 8/2002 | McGregor et al. |
| 6,438,583 B1 | 8/2002 | McDowell et al. |
| 6,438,612 B1 | 8/2002 | Ylonen et al. |
| 6,453,415 B1 | 9/2002 | Ober |
| 6,460,050 B1 | 10/2002 | Pace et al. |
| 6,463,538 B1 | 10/2002 | Elteto |
| 6,470,086 B1 | 10/2002 | Smith |
| 6,487,599 B1 | 11/2002 | Smith et al. |
| 6,493,007 B1 | 12/2002 | Pang |
| 6,507,866 B1 | 1/2003 | Barchi |
| 6,523,119 B2 | 2/2003 | Pavlin et al. |
| 6,529,956 B1 | 3/2003 | Smith et al. |
| 6,546,416 B1 | 4/2003 | Kirsch |
| 6,587,549 B1 | 7/2003 | Weik |
| 6,609,196 B1 | 8/2003 | Dickinson, III et al. |
| 6,615,241 B1 | 9/2003 | Miller et al. |
| 6,615,242 B1 | 9/2003 | Riemers |
| 6,618,747 B1 | 9/2003 | Flynn et al. |
| 6,631,472 B2 | 10/2003 | Kaplan et al. |
| 6,643,686 B1 | 11/2003 | Hall |
| 6,643,687 B1 | 11/2003 | Dickie et al. |
| 6,643,688 B1 | 11/2003 | Fuisz |
| 6,650,890 B1 | 11/2003 | Irlam et al. |
| 6,651,166 B1 | 11/2003 | Smith et al. |
| 6,654,465 B2 | 11/2003 | Ober et al. |
| 6,654,787 B1 | 11/2003 | Aronson et al. |
| 6,671,808 B1 | 12/2003 | Abbott et al. |
| 6,678,734 B1 | 1/2004 | Haatainen et al. |
| 6,704,871 B1 | 3/2004 | Kaplan et al. |
| 6,708,273 B1 | 3/2004 | Ober et al. |
| 6,711,615 B2 | 3/2004 | Porras et al. |
| 6,725,381 B1 | 4/2004 | Smith et al. |
| 6,732,101 B1 | 5/2004 | Cook |
| 6,732,157 B1 | 5/2004 | Gordon et al. |
| 6,748,529 B2 | 6/2004 | Smith |
| 6,757,830 B1 | 6/2004 | Tarbotton et al. |
| 6,769,016 B2 | 7/2004 | Rothwell et al. |
| 6,772,196 B1 | 8/2004 | Kirsch et al. |
| 6,802,012 B1 | 10/2004 | Smithson et al. |
| 6,826,609 B1 | 11/2004 | Smith et al. |
| 6,829,635 B1 | 12/2004 | Townshend |
| 6,842,773 B1 | 1/2005 | Ralston et al. |
| 6,847,825 B1 | 1/2005 | Duvall et al. |
| 6,850,602 B1 | 2/2005 | Chou |
| 6,868,498 B1 | 3/2005 | Katsikas |
| 6,876,858 B1 | 4/2005 | Duvall et al. |
| 6,901,509 B1 | 5/2005 | Kocher |
| 6,907,571 B2 | 6/2005 | Slotznick |
| 6,912,285 B2 | 6/2005 | Jevans |
| 6,941,348 B2 | 9/2005 | Petry et al. |
| 6,944,616 B2 | 9/2005 | Ferguson et al. |
| 6,963,929 B1 | 11/2005 | Lee |
| 7,016,939 B1 | 3/2006 | Rothwell et al. |
| 7,020,642 B2 | 3/2006 | Ferguson et al. |
| 7,051,077 B2 | 5/2006 | Lin |
| 7,062,498 B2 | 6/2006 | Al-Kofahi et al. |
| 7,072,942 B1 | 7/2006 | Maller |
| 7,089,241 B1 | 8/2006 | Alspector et al. |
| 7,107,254 B1 | 9/2006 | Dumais et al. |
| 7,133,660 B2 | 11/2006 | Irlam et al. |
| 7,145,875 B2 | 12/2006 | Allison et al. |
| 7,178,030 B2 | 2/2007 | Scheidt et al. |
| 7,181,764 B2 | 2/2007 | Zhu et al. |
| 7,213,260 B2 | 5/2007 | Judge |
| 7,219,148 B2 | 5/2007 | Rounthwaite et al. |
| 7,266,508 B1 | 9/2007 | Owen et al. |
| 7,287,060 B1 | 10/2007 | McCown et al. |
| 7,320,020 B2 | 1/2008 | Chadwick et al. |
| 7,360,165 B2 | 4/2008 | Cortright et al. |
| 7,401,148 B2 | 7/2008 | Lewis |
| 7,428,410 B2 | 9/2008 | Petry et al. |
| 7,472,422 B1 | 12/2008 | Agbabian |
| 7,506,155 B1 | 3/2009 | Stewart et al. |
| 7,596,600 B2 | 9/2009 | Quine et al. |
| 7,610,344 B2 | 10/2009 | Mehr et al. |
| 7,657,935 B2 | 2/2010 | Stolfo et al. |
| 7,680,890 B1 | 3/2010 | Lin |
| 7,870,240 B1 | 1/2011 | Horvitz et al. |
| 7,953,814 B1 | 5/2011 | Chasin et al. |
| 7,970,832 B2 | 6/2011 | Perry et al. |
| 8,082,491 B1 * | 12/2011 | Abdelaziz ............ G06F 16/9537 715/234 |
| 8,363,793 B2 | 1/2013 | Chasin et al. |
| 8,484,295 B2 | 7/2013 | Chasin et al. |
| 8,531,414 B2 | 9/2013 | Huibers |
| 8,738,708 B2 | 5/2014 | Chasin |
| 9,015,472 B1 | 4/2015 | Chasin |
| 9,160,755 B2 | 10/2015 | Chasin |
| 9,560,064 B2 | 1/2017 | Chasin et al. |
| 2002/0007453 A1 | 1/2002 | Nemovicher |
| 2002/0059454 A1 * | 5/2002 | Barrett .................... H04L 51/28 709/245 |
| 2002/0120697 A1 | 8/2002 | Generous et al. |
| 2002/0188863 A1 | 12/2002 | Friedman |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0061506 A1 | 3/2003 | Cooper et al. |
| 2003/0074413 A1 * | 4/2003 | Nielsen .................. H04L 67/02 709/206 |
| 2003/0101181 A1 | 5/2003 | Al-Kofahi et al. |

(56) References Cited

U.S. PATENT DOCUMENTS

| | | |
|---|---|---|
| 2003/0158905 A1 | 8/2003 | Petry et al. |
| 2003/0167402 A1 | 9/2003 | Stolfo et al. |
| 2003/0172294 A1 | 9/2003 | Judge |
| 2003/0177387 A1* | 9/2003 | Osterwalder ........... H04L 63/08 726/12 |
| 2003/0187937 A1 | 10/2003 | Yao et al. |
| 2003/0187942 A1 | 10/2003 | Quine et al. |
| 2003/0212546 A1 | 11/2003 | Shaw |
| 2003/0220978 A1* | 11/2003 | Rhodes ................. H04L 63/126 709/206 |
| 2003/0236835 A1 | 12/2003 | Levi et al. |
| 2003/0236847 A1 | 12/2003 | Benowitz et al. |
| 2004/0058673 A1 | 3/2004 | Irlam et al. |
| 2004/0078334 A1 | 4/2004 | Malcolm et al. |
| 2004/0088369 A1 | 5/2004 | Yeager et al. |
| 2004/0088551 A1 | 5/2004 | Dor et al. |
| 2004/0177110 A1 | 9/2004 | Rounthwaite et al. |
| 2004/0177120 A1 | 9/2004 | Kirsch |
| 2004/0177271 A1 | 9/2004 | Arnold et al. |
| 2004/0199597 A1 | 10/2004 | Libbey et al. |
| 2004/0267893 A1 | 12/2004 | Lin |
| 2005/0010644 A1 | 1/2005 | Brown et al. |
| 2005/0015626 A1 | 1/2005 | Chasin |
| 2005/0021649 A1 | 1/2005 | Goodman et al. |
| 2005/0044153 A1* | 2/2005 | Gross ..................... H04L 51/12 709/206 |
| 2005/0044170 A1 | 2/2005 | Cox et al. |
| 2005/0063365 A1 | 3/2005 | Mathew et al. |
| 2005/0064850 A1 | 3/2005 | Irlam et al. |
| 2005/0076084 A1 | 4/2005 | Loughmiller et al. |
| 2005/0076220 A1* | 4/2005 | Zhang .................. H04L 63/126 713/176 |
| 2005/0080816 A1 | 4/2005 | Shipp |
| 2005/0081059 A1 | 4/2005 | Bandini et al. |
| 2005/0091272 A1 | 4/2005 | Smith et al. |
| 2005/0125667 A1 | 6/2005 | Sullivan et al. |
| 2005/0149726 A1 | 7/2005 | Joshi et al. |
| 2005/0149747 A1 | 7/2005 | Wesinger et al. |
| 2005/0182959 A1 | 8/2005 | Petry et al. |
| 2005/0182960 A1 | 8/2005 | Petry et al. |
| 2005/0198159 A1 | 9/2005 | Kirsch |
| 2005/0198170 A1 | 9/2005 | LeMay et al. |
| 2005/0198182 A1 | 9/2005 | Prakash et al. |
| 2005/0240617 A1 | 10/2005 | Lund et al. |
| 2005/0259667 A1 | 11/2005 | Vinokurov et al. |
| 2005/0266832 A1 | 12/2005 | Irlam et al. |
| 2006/0015726 A1 | 1/2006 | Callas |
| 2006/0026242 A1 | 2/2006 | Kuhlman |
| 2006/0031483 A1 | 2/2006 | Lund et al. |
| 2006/0039540 A1 | 2/2006 | Issinski |
| 2006/0047766 A1* | 3/2006 | Spadea, III ............. H04L 51/28 709/206 |
| 2006/0075497 A1 | 4/2006 | Garg |
| 2006/0080432 A1 | 4/2006 | Spataro et al. |
| 2006/0080613 A1* | 4/2006 | Savant ................... G06Q 30/06 715/745 |
| 2006/0085505 A1 | 4/2006 | Gillum et al. |
| 2006/0095524 A1 | 5/2006 | Kay et al. |
| 2006/0149823 A1 | 7/2006 | Owen et al. |
| 2006/0168006 A1 | 7/2006 | Shannon et al. |
| 2006/0168024 A1 | 7/2006 | Mehr et al. |
| 2006/0168057 A1 | 7/2006 | Warren et al. |
| 2006/0277220 A1* | 12/2006 | Patrick ................ G06F 21/6218 |
| 2006/0277597 A1* | 12/2006 | Dreymann ............ H04L 9/3213 726/4 |
| 2007/0008987 A1* | 1/2007 | Manion .................. G06Q 10/10 370/462 |
| 2007/0011252 A1* | 1/2007 | Taylor .................... H04L 51/28 709/206 |
| 2007/0044152 A1 | 2/2007 | Newman et al. |
| 2007/0067392 A1 | 3/2007 | Torres et al. |
| 2007/0100949 A1* | 5/2007 | Hulten .................. G06Q 10/00 709/206 |
| 2007/0106698 A1* | 5/2007 | Elliott .................... H04L 51/28 |
| 2007/0107059 A1 | 5/2007 | Chasin et al. |
| 2007/0214227 A1* | 9/2007 | Quinn ................ G06Q 30/0255 709/206 |
| 2007/0244974 A1 | 10/2007 | Chasin |
| 2008/0294726 A1 | 11/2008 | Sidman |
| 2009/0319781 A1* | 12/2009 | Byrum .................... H04L 51/00 713/156 |
| 2010/0030858 A1 | 2/2010 | Chasin |
| 2011/0187652 A1 | 8/2011 | Huibers |
| 2011/0191438 A1 | 8/2011 | Huibers et al. |
| 2011/0191823 A1 | 8/2011 | Huibers |
| 2011/0197275 A1 | 8/2011 | Chasin et al. |
| 2013/0041955 A1 | 2/2013 | Chasin et al. |
| 2013/0117397 A1 | 5/2013 | Chasin et al. |
| 2013/0130714 A1 | 5/2013 | Huibers et al. |
| 2013/0217335 A1 | 8/2013 | Huibers et al. |
| 2013/0326622 A9 | 12/2013 | Chasin et al. |
| 2014/0141818 A1 | 5/2014 | Yoakum |
| 2015/0142905 A1 | 5/2015 | Chasin |
| 2015/0358352 A1 | 12/2015 | Chasin et al. |
| 2016/0156654 A1 | 6/2016 | Chasin et al. |

OTHER PUBLICATIONS

Miyake et al., "A Method to Detect Unknown Computer Virus Using Virtual Server,", Technical Report of Information Processing Society of Japan, 2002-CSEC-18, Jul. 19, 2002.

"Allegro Mailzone Filters Junk E-Mail," Law Technology Product News, vol. 6, Issue 3, Mar. 1999, available at www.webarchive.org, downloaded Apr. 29, 2006 (1 page).

"Allegro messaging company has protected 1,000 businesses from viruses," Dayton Business Journal, Jun. 11, 1999, available at www.dayton.biziomals.com, downloaded Apr. 29, 2006 (3 pages).

"Allegro's Mailzone Blocks Illegal MP3 Files," Allegro.net press release, Jul. 14, 1999, available at www.webarchive.org, downloaded Apr. 29, 2006 (2 pages).

"Allegro's Mailzone Stops Back Orifice 2000," Allegro.net press release Jul. 14, 1999, available at www.webarchive.org, downloaded Apr. 29, 2006 (2 pages).

"Allegro's Mailzone Stops Back Orifice 2000," Allegro.net press release, Jul. 15, 1999, available at www.webarchive.org, downloaded Apr. 29, 2006 (2 pages).

"Allegro's Mailzone Stops 'Worm' While on the Net," Allegro.net press release, Jun. 10, 1999, available at www.webarchive.org, downloaded Apr. 29, 2006 (2 pages).

"Allegro's Richard Bliss to speak at upcoming 'E-mail Outsourcing' conference," Allegro.net press release, Jun. 2, 1999, available at www.webarchive.org, downloaded Apr. 29, 2006 (1 page).

"Phantom Menace a real menace to network administrators," Allegro.net press release, Apr. 28, 1999, available at www.webarchive.org, downloaded Apr. 29, 2006 (2 pages).

Yoshimi et al., "Proposal of Nat/Proxy Traversing Remote Access Technology," Technical Report of the Institute of Electronics, Information and Communication Engineers, NS2005-84, Sep. 8, 2005.

Takata, Manabu "Servey [sic] & Choice, Mail Filtering Software—Excellently High Degree of Freedom in Setting up—Applicability to Coded Emails Starting," Nikkei Communications, No. 302, Sep. 20, 1999, pp. 121-127.

Bhattacharyya, Manasi, et al., research paper, "MET: An Experimental System for Malicious Email Tracking," Columbia University and Cornell University, published 2002 (11 pages).

Corporate Factsheet 2005,Clearswift Ltd., downloaded Nov. 6, 2005 (12 pages).

Graham, Better Bayesian Filtering, Jan. 2003 (12 pages).

Gupta, A., et al., research paper, "An Approach for Detecting Self-Propagating Email Using Anamoly Detection," Department of Computer Science, Stony Brook University, published 2003 (18 pages).

Lindberg, G., RFC 2505—Anti-Spam Recommendations for SMTP MTAs, The Internet Society, Feb. 1999, available at http://www.fags.org/rfcs/rfc2505.html, downloaded Nov. 6, 2005 (19 pages).

(56) References Cited

OTHER PUBLICATIONS

Listserv 14.5 @ Miami University, "Allegro Mailzone Filters Unwanted E-mail," Jan. 25, 1999, available at www.listserv.muohio.edu, downloaded Apr. 29, 2006 (6 pages).
M. Sahami, S. Dumais, D. Heckerman, and E. Horvitz, "A Bayesian approach to filtering junk e-mail", In Learning for Text Categorization—Papers from the AAAI Workshop, pp. 55-62, Madison, Wisconsin, 1998 (8 pages).
Mail Abuse Prevention System, LLC, Basic Mailing List Management Guidelines for Preventing Abuse, available at http://web.archive.org/web/20010309004654/maps.vix.com/manage.html, downloaded Nov. 6, 2005 (3 pages).
Mailzone—Message Management Services—Mail Watch Next Generation, Web Site, available at www.webarchive.org, downloaded Apr. 29, 2006 (22 pages).
McNamara, Paul, "Take my apps—please," NetworkWorld, May 31, 1999, available at www.networkworld.com, downloaded Apr. 29, 2006 (7 pages).
Peer-to-Peer (P2P) Roadmap; Website: http://msdn2.microsoft.com/en-us/library/bb756997(printer).aspx, date retrieved Feb. 1, 2008, 4 pages.
People Near Me; Microsoft TechNet, Website: http://technet.microsoft.com/en-us/library/bb726969(printer).aspx, published Sep. 27, 2006, date retrieved Feb. 1, 2008, 6 pages.
Postfix.org web site, available at http://www.postfix.org, downloaded Nov. 6, 2005 (251 pages).
Sendmail, Inc., Sendmail.org home page, available at http://www.sendmail.org/, downloaded Nov. 6, 2005 (110 pages).
Sergeant, Internet Level Spam Detection and SpamAssassin 2.50, MessageLabs, http://spamassassin.apache.org/presentations/SpamConf2003.pdf, 2003 (21 pages).
Stolfo, Salvatore J., et al., research paper, "Combining Behavior Models to Secure E-Mail Systems," Columbia University, May 16, 2003 (14 pages).
Stolfo, Salvatore J., et al.,research paper, "Detecting Viral Propagations Using Email Behavior Profiles," Columbia University, 2003 (47 pages).
Thyfault, Mary E., "Companies choose outside e-mail services for cost, functionality, and easy administration," Information Week, Aug. 2, 1999, available at www.informationweek.com, downloaded Apr. 29, 2006 (5 pages).
Woitaszek, M.; Shaaban, M.; Czemikowski, R., "Identifying junk electronic mail in Microsoft outlook with a support vector machine," Proceedings of the 2003 Symposium on Application and the Internet, Jan. 27-31, 2003 (4 pages).
Zachariassen, Rayan, Zmailer the Manual, v. 1.99.26. 200602020935, available at http://www.smailer.org/zman/zmanual.shtml, downloaded Apr. 28, 2006 (312 pages).
"ActivIdentity Technology Brief, Solutions for Strong Authentication" ActivIdentity, Copyright 2007 (2 pages).
"ActivIdentity Technology Brief, Device and Credential Management," ActivIdentity, Copyright 2006 (2 pages).
"Device and Credential Management Solutions", ActivIdentity, www.actividentity.com, Jul. 3, 2007 (2 pages).
"ActivIdentity, Technology Brief, Secure Information and Transactions", ActivIdentity, Copyright 2006 (2 pages).
"ActivIdentity, Technology Brief, Enterprise Single Sign-On," Copyright 2006 (2 pages).
"Strong Authentication Solutions", ActivIdentity, www.actividentity.com, Jul. 4, 2007.
Rodger, Allan, "Technology Audit, Security, ActivIdentity Smart Employee ID," Butler Group Subscription Services, TA00011173SEC, Jan. 2007 (8 pages).
Hudson, Sally, "White Paper—ActivIdentity: Digital Proof of Identity for Evolving Ecosystems," IDC sponsored by ActivIdentity, Oct. 2006 (13 pages).
"Apply for the Bump API now!", Bump Technologies, Inc., www.bu.mp, Dec. 25, 2009 (2 pages).
"Frequently Asked Questions", Bump Technogies, Inc., www.bu.mp, Dec. 26, 2009 (2 pages).

Kincaid, Jason, "Bump Shares Its Phone Tapping, Data Swapping Technology with New API", TechCrunch, Dec. 22, 2009 (1 page).
Kincaid, Jason, "Bump Goes Cross-Platform with New Android App; Upgrades iPhone Version Too", TechCrunch, Nov. 11, 2009 (1 page).
"Bump Technologies, for iPhone, Android", Bump Technologies, Inc., www.bu.mp, May 22, 2010 (1 page).
Webpage, Products, Ping Identity Corporation, www.pingidentity.com, Dec. 13, 2002 (1 page).
"PingID Network Provides Enterprises with Complete Business Framework for Inter-Company Identity Management," Ping Identity Corporation, www.pingidentity.com, Jan. 28, 2003 (2 pages).
"PingID, Addressing Identity Fraud," Ping Identity Corporation, Mar. 16, 2013 (15 pages).
"Ping Identity Releases SourcID SSO, an Open Source, Liberty Complaint Toolkit for Federated Identity and Single Sing-On," Ping Identity Corporation, Jan. 20, 2003 (2 pages).
Norlin et al., "Federated Identity Management, Corporate Strategies for Managing Security, Liability, Scalability and the Risk of Fraud as Identity Moves Toward Federation," PingID, www.pingidentity.com, Copyright 2003 (12 pages).
"Federation Primer, Digital Identity Basics," PingIdentity Corporation, Copyright 2004 (6 pages).
Elliot, et a., "Scenarios for Identity Federation and Drivers of the Identity Network," Ping Identity Corporation and Nokio Innovent, Copyright 2004 (24 pages).
"White Paper, 5 Steps to Secure Internet SSO," PingIdentity Corporation, Copyright 2008 (6 pages).
"iKey 1000 Two-Factor Authentication for Your Digital Identity," SafeNet, Inc., www.safenet-inc.com, Feb. 13, 2005 (2 pages).
"SafeNet VPN Solutions," SafeNet, Inc., www.safenet-inc.com, Feb. 13, 2005 (2 pages).
"An IPSec CPN Gateway with GigaBit Performance, Low Latency, and Tigh Throughput", SafeNet, Inc., www.safenet-inc.com, Feb. 13, 2005.
"Efficient Cryptographic Association," SafeNet, Inc., www.safenet-inc.com, Dec. 12, 204 (1 page).
"iKey 1000, Workstation Security and Secure Remote Access," SafeNet, Inc., Copyright 2004 (2 pages).
"Welcome to SafeNet, Inc.'s Online Store for SafeNet Products", SafeNet, Inc. www.soft-pk.com, Nov. 17, 2000 (3 pages).
"SSL-Based Remote Access," SafeNet, Inc. www-safenet-inc.com, Mar. 5, 2005 (2 pages).
"SafeEnterprise SSL iGate", SafeNet, Inc., Copyright 2005 (2 pages).
"DocuSign Express, Features and Benefits", DocuSign, Inc., www.docusign.com, Jun. 16, 2004 (2 pages).
"DocuSign Express makes it Easy and Fast," DocuSign, Inc., www.docusign.com, Jul. 11, 2004 (3 pages).
"New Norton Anti-theft to Protect Lost or Stolen Laptops, Smartphones and Tablets", Symantec Corporation, Oct. 4, 2011 (6 pages).
Dawson et al, "vCard MIME Directory Profile", Sep. 1998; Nework Working Group, RFC 2426; 39 pages.
Notice of Allowance in U.S. Appl. No. 10/873,882 dated Jan. 3, 2006.
Nonfinal Office Action in U.S. Appl. No. 10/888,370, dated Jul. 31, 2007.
Final Office Action in U.S. Appl. No. 10/888,370 dated Jan. 16, 2008.
Nonfinal Office Action in U.S. Appl. No. 10/888,370 dated Sep. 22, 2008.
Final Office Action in U.S. Appl. No. 10/888,370 dated May 27, 2009.
U.S. Appl. No. 11/365,130, filed Feb. 28, 2006, entitled "Stopping and Remediating Outbound Messaging Abuse," Inventor C. Scott Chasin.
Non-Final Office Action in U.S. Appl. No. 11/365130 dated Aug. 4, 2009.
Final Office Action in U.S. Appl. No. 11/365,130 dated Mar. 18, 2010.
Non-Final Office Action in U.S. Appl. No. 11/365,130 dated Oct. 6, 2010.

(56) References Cited

OTHER PUBLICATIONS

Notice of Allowance in U.S. Appl. No. 11/365,130 dated Jan. 27, 2011.
Notice of Allowance in U.S. Appl. No. 11/365,130 dated Feb. 10, 2011.
Notice of Allowance in U.S. Appl. No. 11/365,130 dated Mar. 29, 2011.
Non-Final Office Action in U.S. Appl. No. 13/091,011 dated May 9, 2012.
Notice of Allowance in U.S. Appl. No. 13/091,011 dated Aug. 17, 2012.
Corrected Notice of Allowance in U.S. Appl. No. 13/091,011 dated Oct. 2, 2012.
U.S. Appl. No. 13/726,607, filed Dec. 25, 2012, and entitled "Stopping and Remediating Outbound Messaging Abuse," Inventors C. Scott Chasin, et al.
Non-Final Office Action in U.S. Appl. No. 13/726,607 dated Apr. 24, 2014.
Final Office Action in U.S. Appl. No. 13/726,607 dated Aug. 28, 2014.
Non-Final Office Action in U.S. Appl. No. 13/726,607 dated Feb. 11, 2015.
Final Office Action in U.S. Appl. No. 13/726,607 dated May 20, 2015.
Notice of Allowance in U.S. Appl. No. 13/726,607 dated Aug. 3, 2015.
U.S. Appl. No. 14/954,044, filed Nov. 30, 2015 and entitled "Stopping and Remediating Outbound Messaging Abuse," Inventors C. Scott Chasin, et al.
Non-Final Office Action in U.S. Appl. No. 14/954,044 dated Jun. 13, 2016.
Notice of Allowance in U.S. Appl. No. 14/954,044 dated Sep. 29, 2016.
Final Office Action in U.S. Appl. No. 11/372,970 dated Feb. 1, 2010.
Non-Final Office Action in U.S. Appl. No. 11/372,970 dated May 13, 2010.
Final Office Action in U.S. Appl. No. 11/372,970 dated Oct. 21, 2010.
Notice of Allowance in U.S. Appl. No. 11/372,970 dated Oct. 26, 2014.
Notice of Allowance in U.S. Appl. No. 11/372,970 dated Dec. 5, 2014.
U.S. Appl. No. 14/610,307, filed Jan. 30, 2015, entitled "Marking Electronic Messages to Indicate Human Origination," Inventor C. Scott Chasin.
Non-Final Office Action in U.S. Appl. No. 14/610,307 dated May 21, 2015.
Notice of Allowance in U.S. Appl. No. 14/610,307 dated Jan. 30, 2015.
U.S. Appl. No. 11/315,480, filed Dec. 21, 2005, entitled Subscriber Reputation Filtering Method for Analyzing Subscriber Activity and Detecting Account Misuse, Inventor C. Scott Chasin.
Non-Final Office Action in U.S. Appl. No. 11/315,480 dated Sep. 17, 2008.
Final Office Action in U.S. Appl. No. 11/315,480 dated Apr. 27, 2009.
Non-Final Office Action in U.S. Appl. No. 11/315,480 dated Jan. 21, 2010.
Final Office Action in U.S. Appl. No. 11/315,480 dated Jul. 9, 2010.
Non-Final Office Action in U.S. Appl. No. 11/315,480 dated Oct. 17, 2012.
Notice of Allowance in U.S. Appl. No. 11/315,480 dated Feb. 5, 2013.
U.S. Appl. No. 11/394,890, entitled Fuzzy Logic Voting Method and System for Classifying E-Mail Using Inputs from Multiple SPAM Classifiers, filed Mar. 31, 2006.
Non-Final Office Action in U.S. Appl. No. 11/394,890 dated Oct. 6, 2008.
Notice of Allowance in U.S. Appl. No. 11/394,890 dated Jun. 26, 2009.
Notice of Allowance in U.S. Appl. No. 11/394,890 dated Oct. 29, 2009.
U.S. Appl. No. 11/465,433, entitled "Trusted Communication Network", filed Aug. 17, 2006.
Non-Final Office Action in U.S. Appl. No. 11/465,433 dated Oct. 6, 2009.
Final Office Action in U.S. Appl. No. 11/465,433 dated Apr. 28, 2010.
Non-Final Office Action in U.S. Appl. No. 11/465,433 dated Dec. 7, 2012.
Final Office Action in U.S. Appl. No. 11/465,433 dated Nov. 8, 2013.
Notice of Allowance in U.S. Appl. No. 11/465,433 dated May 11, 2015.
U.S. Appl. No. 14/830,545, filed Aug. 19, 2015 and entitled Trusted Communication Network, inventor C. Scott Chasin.
Non-Final Office Action in U.S. Appl. No. 14/830,545 dated Aug. 12, 2016.
Non-Final Office Action in U.S. Appl. No. 14/830,545 dated Sep. 27, 2017.
Final Office Action in U.S. Appl. No. 14/830,545 dated Feb. 28, 2017.
Final Office Action in U.S. Appl. No. 14/830,545 dated May 23, 2018, 27 pages.
U.S. Appl. No. 11/537,432, entitled "Bounce Management in a Trusted Communication Network," filed Sep. 29, 2006.
Non-Final Office Action in U.S. Appl. No. 11/537,432 dated May 11, 2009.
Final Office Action in U.S. Appl. No. 11/537,432 dated Jan. 27, 2010.
Notice of Allowance in U.S. Appl. No. 11/537,432 dated Feb. 10, 2012.
Notice of Allowance in U.S. Appl. No. 11/537,432 dated Aug. 3, 2012.
Notice of Allowance in U.S. Appl. No. 11/537,432 dated Nov. 30, 2012.
Notice of Allowance in U.S. Appl. No. 11/537,432 dated Feb. 3, 2014.
Non-Final Office Action in U.S. Appl. No. 12/185,517 dated Sep. 1, 2010.
Final Office Action in U.S. Appl. No. 12/185,517 dated Mar. 4, 2011.
Non-Final Office Action in U.S. Appl. No. 12/185,517 dated Jun. 15, 2016.
Final Office Action in U.S. Appl. No. 12/185,517 dated Oct. 4, 2016.
Final Office Action in U.S. Appl. No. 12/185,517 dated Apr. 12, 2017.
Non-Final Office Action in U.S. Appl. No. 12/185,517 dated Feb. 21, 2018, 22 pages.
Final Office Action in U.S. Appl. No. 12/185,517 dated Sep. 21, 2018.
Notice of Allowance in U.S. Appl. No. 12/185,517 dated Mar. 20, 2019.

* cited by examiner

METHOD AND SYSTEM FOR CENTRALIZED CONTACT MANAGEMENT

CROSS-REFERENCE TO RELATED APPLICATIONS

This application is a continuation (and claims the benefit of priority under 35 U.S.C. § 120) of U.S. application Ser. No. 12/185,517, filed on Aug. 4, 2008, and entitled "METHOD AND SYSTEM FOR CENTRALIZED CONTACT MANAGEMENT". The disclosure of the prior application is considered part of (and is incorporated by reference in) the disclosure of this application.

BACKGROUND OF THE INVENTION

Typical e-mail software permits a user to send and receive e-mail. Often, the e-mail system consists of an e-mail client that communicates with a server system. Where there is an e-mail client and an e-mail server, the e-mail server typically handles the interconnection to the Internet while the client communicates with the server to send and receive e-mails specific to the e-mail client user. A common name for the e-mail client software is a Mail User Agent or MUA. A typical user often includes contact information in the signature section of the body of an e-mail. When an MUA user receives an e-mail from a sender that is not in the address book of the receiving MUA user, the MUA receiving user may manually extract the sender's contact information from the body of the received e-mail (e.g., manually extract contact information from the signature block of the received e-mail) in order to manually add the sender's contact information to the receiver's address book. The decision on what contact information to include in the body of the e-mail is up to the sending user and may be changed in each e-mail created by the sending. Many MUA's provide a signature function which permits the sending user to automatically include a customizable signature that may also include certain contact information, such as the sending user's name, phone number, e-mail address, company name, and job title. If the sending user changes contact information, the receiving user must either be specifically notified by the sender that the information has changed and needs to be updated or the receiving user must notice that the information has changed and update the information in the address book accordingly.

SUMMARY OF THE INVENTION

An embodiment of the present invention may comprise a method for managing contacts comprising: providing a communication system having a centralized computer system that has communication access to and from users of the communication system, the centralized computer system having computer readable storage media; storing a centralized contact database containing contact information for the users of the communication system on the computer readable storage media of the centralized communication system; creating an electronic message to send through the communication system from a sending user to a receiving user; embedding a sender identification token that identifies the sending user to the communication system into the electronic message; sending the electronic message from the sending user to the receiving user through the communication system; receiving the electronic message by the receiving user; extracting the sender identification token from the electronic message after said electronic message is received; sending the sender identification token with the request from the receiving user for the sender contact information of the sending user to the centralized contact database; requesting sender contact information of the sending user by the receiving user; locating the sender contact information in the centralized contact database based on the sender identification token; delivering the sender contact information to the receiving user; and adding the sender contact information to a list of contacts for the receiving user.

An embodiment of the present invention may further comprise a communication system with centralized contact management comprising: a centralized computer system that has communication access to and from users of the communication system, the centralized computer system having computer readable storage media; a centralized contact database containing contact information for the users of the communication system stored on the computer readable storage media of the centralized communication system; an electronic message creation subsystem that creates an electronic message to send through the communication system from a sending user to a receiving user and embeds a sender identification token that identifies the sending user to the communication system in the electronic message; an electronic message sending subsystem that sends the electronic message from the sending user to the receiving user through the communication system; an electronic message receiving subsystem that receives the electronic message by the receiving user; a request sender contact information subsystem that extracts the sender identification token from the electronic message, requests sender contact information of the sending user by the receiving user, and sends the sender identification token with the request from the receiving user for the sender contact information of the sending user to the centralized contact database; a contact information request handler subsystem that locates the sender contact information in the centralized contact database based on the sender identification token and delivers the sender contact information to the receiving user; and a contact management list subsystem that adds the sender contact information to a list of contacts for the receiving user.

An embodiment of the present invention may further comprise a communication system with centralized contact management comprising: means for providing a communication system having a centralized computer system that has communication access to and from users of the communication system; means for storing a centralized contact database containing contact information for the users of the communication system on the centralized communication system; means for creating an electronic message to send through the communication system from a sending user to a receiving user; means for embedding a sender identification token that identifies the sending user to the communication system into the electronic message; means for sending the electronic message from the sending user to the receiving user through the communication system; means for receiving the electronic message by the receiving user; means for extracting the sender identification token from the electronic message; means for requesting sender contact information of the sending user by the receiving user; means for sending the sender identification token with the request from the receiving user for the sender contact information of the sending user to the centralized contact database; means for locating the sender contact information in the centralized contact database based on the sender identification token; means for delivering the sender contact information to the receiving user; means for adding the sender contact information to a list of contacts for the receiving user.

An embodiment of the present invention may further comprise a method for managing contacts for a user sending an electronic message comprising: providing a trusted communication system having a centralized computer system that has communication access to and from trusted users of the trusted communication system, the centralized computer system having computer readable storage media; storing a centralized contact database containing contact information for the trusted users of the trusted communication system on the computer readable storage media of the centralized trusted communication system; creating the electronic message to send through the trusted communication system from a sending trusted user to a receiving trusted user; embedding a sender identification token that identifies the sending trusted user to the trusted communication system into the electronic message; sending the electronic message from the sending trusted user to the receiving trusted user through the trusted communication system; requesting recipient contact information of the receiving trusted user by the sending trusted user from the centralized contact database; extracting the sender identification token from the electronic message; validating that the sending trusted user is a valid member of the trusted communication system using the sender identification token; locating the recipient contact information in the centralized contact database; delivering the recipient contact information to the sending trusted user; and adding said recipient contact information to a list of contacts for said sending trusted user.

An embodiment of the present invention may further comprise a trusted communication system with centralized contact management that assists a user sending an electronic message comprising: a centralized computer system that has communication access to and from users of said trusted communication system, said centralized computer system having computer readable storage media; a centralized contact database containing contact information for the users of the trusted communication system stored on the computer readable storage media of the centralized trusted communication system; an electronic message creation subsystem that creates the electronic message to send through the trusted communication system from a sending trusted user to a receiving trusted user and embeds a sender identification token that identifies the sending trusted user to the trusted communication system in the electronic message; an electronic message sending subsystem that sends the electronic message from the sending trusted user to the receiving trusted user through the trusted communication system; a request recipient contact information subsystem that requests recipient contact information of the receiving trusted user by the sending trusted user, extracts the sender identification token from the electronic message, and validates that the sending trusted user is a valid member of the trusted communication system using the sender identification token; a contact information request handler subsystem that locates the recipient contact information in the centralized contact database and delivers the recipient contact information to the sending trusted user; and a contact management list subsystem that adds the recipient contact information to a list of contacts for the sending trusted user.

An embodiment of the present invention may further comprise a trusted communication system with centralized contact management that assists a user sending an electronic message comprising: means for providing a trusted communication system having a centralized computer system that has communication access to and from trusted users of the trusted communication system; means for storing a centralized contact database containing contact information for the trusted users of the trusted communication system on the centralized trusted communication system; means for creating the electronic message to send through the trusted communication system from a sending trusted user to a receiving trusted user; means for embedding a sender identification token that identifies the sending trusted user to the trusted communication system into the electronic message; means for sending the electronic message from the sending trusted user to the receiving trusted user through the trusted communication system; means for requesting recipient contact information of the receiving trusted user by the sending trusted user from the centralized contact database; means for extracting the sender identification token from the electronic message; means for validating that the sending trusted user is a valid member of the trusted communication system using the sender identification token; means for locating the recipient contact information in the centralized contact database; means for delivering the recipient contact information to the sending trusted user; and means for adding the recipient contact information to a list of contacts for the sending trusted user.

DETAILED DESCRIPTION OF THE EMBODIMENTS

Figure 1:
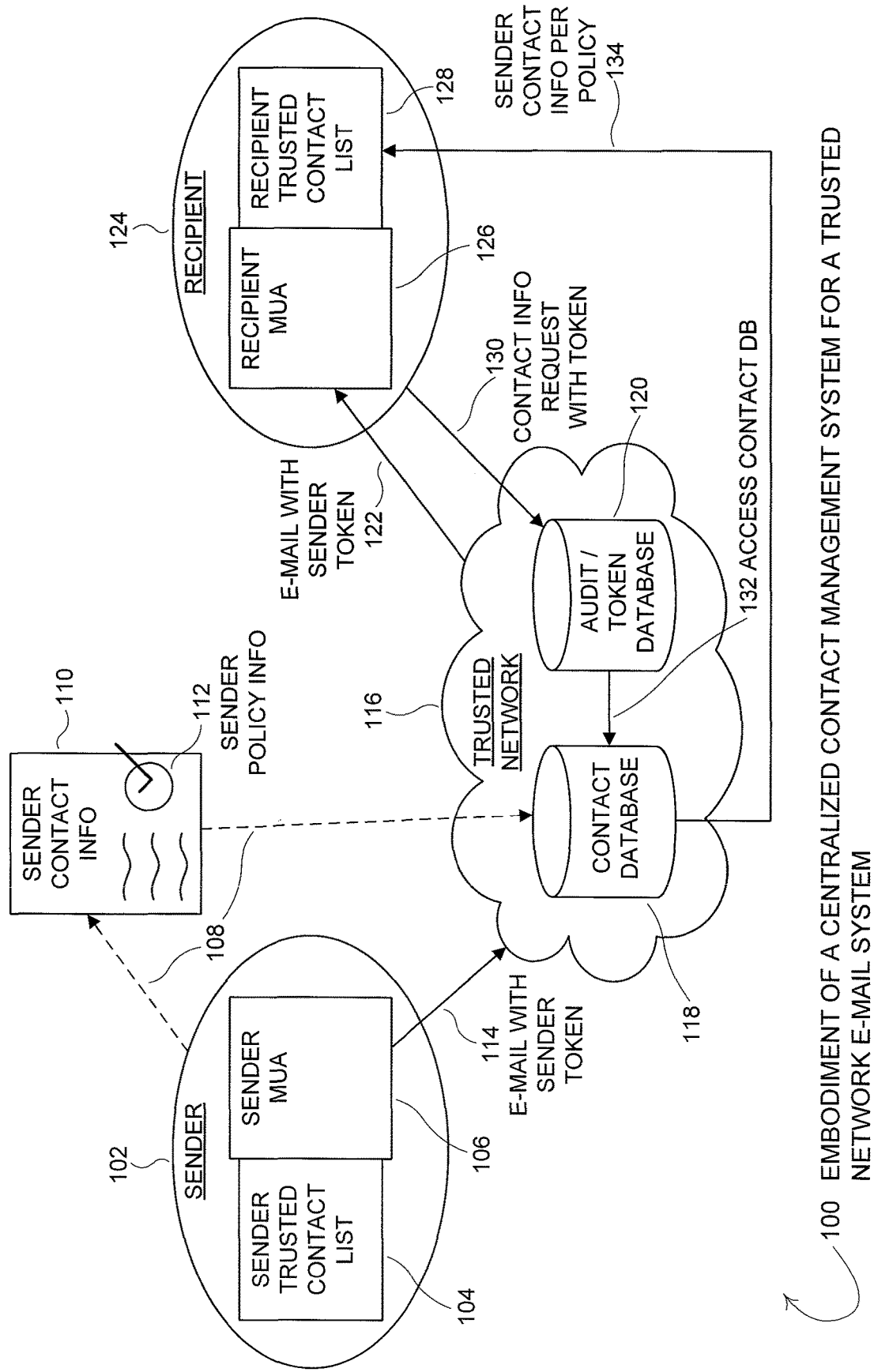
FIG. 1 is a schematic illustration of an embodiment of a centralized contact management system for a trusted network e-mail system.

Some e-mail systems may be enhanced by creating a trusted e-mail system that provides an indication of the trustworthiness of an e-mail. One potential means to identify an e-mail as trustworthy is to provide a service to register e-mail users to a system that identifies them as trusted users. The trusted e-mail service provider may restrict users of the system in order to enforce trust parameters of the e-mail system. The user may also further differentiate between trusted e-mails by selecting particular persons and/or organizations within the trusted system as preferred communication partners. A trusted e-mail system may permit e-mail from the public Internet to be received by a trusted member of the system. Other trusted e-mail systems may not permit mail from the public Internet to be received by the trusted member of the system, i.e., the system may only permit outbound e-mail to the public Internet and no inbound e-mails from a public Internet user. Still other trusted e-mail systems may not permit either inbound or outbound e-mail messages from the public Internet. The trusted e-mail system will typically vary the degree and depth of spam filtering based on the trust level of the sending user. Thus, a more trusted sending user is less likely to have e-mailed blocked as spam.

While an embodiment does not require that a communication system be a trusted network, many embodiments may utilize a trusted network as the core of the communications system. A trusted network is a system that may be utilized to assist in filtering e-mails for unwanted e-mails (aka spam) by limiting membership to the trusted network 116 to previously verified trusted members. The operator of the trusted network controls membership to the network and excludes users that send spam e-mail messages. Further, the operator of the trusted network may also maintain information on each user such that additional filtering types of filtering may be available. For example, the trusted network operator may keep track of the company or enterprise affiliation for each trusted member in order to permit an additional level of spam filtering for the trusted network where trusted members affiliated with the same company have an additional, higher level of trust than a general trusted network member. The network may also maintain a specific list of individually trusted members for a member where the individually designated members have higher or lower levels of trust than general members at the discretion of the designating trusted member. The trusted network may also permit "public" users to receive e-mail from trusted members through a public connection of the trusted network 116 with the public Internet. E-mail message may be filtered for spam most aggressively for e-mail from public access users. By keeping track of the additional information and providing access to trusted members for non-trusted users of the public Internet, multiple levels of spam filtering may be maintained. The spam filter may be less aggressive for e-mails from general trusted network members. The spam filter may be even less aggressive for e-mails from trusted members affiliated with the same organization as the receiving trusted member. E-mails from members individually trusted by the receiving trusted user may be filtered with the least aggressive spam filter desired by the receiving trusted user. Typically a trusted member must maintain a list of contacts that is separate and distinct from the trusted network system.

In many cases, the Mail User Agent (MUA) client software has been expanded to include other Personal Information Management (PIM) features such as an appointment calendar, a address book, a task list, and/or a note management system. In a typical system, the contacts in the address book are managed manually by the MUA user. The contacts in the address book may be used as a list to select potential e-mail recipients when the MUA user wishes to send an e-mail.

FIG. 1 is a schematic illustration 100 of an embodiment of a centralized contact management system for a trusted network 116 e-mail system. Each member of a trusted network 116 supplies contact information for the trusted network member to the trusted network 116. In the embodiment illustrated 100, the contact information supplied by the sender 102 trusted network member is shown 108, 110, 112 being delivered to the trusted network 116 and the contact database 118. The sender supplies 108 contact information 110 and associated security policy information 112 to the trusted network 116. Other trusted members of the trusted network may also supply contact and policy information in a similar fashion as the contact information 110 for the sender 102 is delivered 108 to the contact database 118. Sender contact information 110 may include a variety information associated with the sender 102, including, but not limited to: name, nick name, postal addresses, e-mail addresses, instant message addresses, text message addresses, phone numbers, facsimile numbers, enterprise/company name, job title, photograph, image, avatar, birthday, and notes. An embodiment may support multiple instances of different information, such as allowing for multiple phone numbers which may be useful when a contact has a business phone number, home phone number, cellular phone number, and possibly many more phone numbers. An embodiment may also include contact information defined by the "vcard" standard maintained by the Internet Engineering Task Force (IETF), which may include some of the contact information described above as well as other additional information. The most current version of the "vcard" standard is associated with Request For Comment (RFC) 2426. The IETF is an organized activity of the Internet Society (ISOC) located at 1775 Wiehle Avenue, Suite 102, Reston, Va. 20190-5108. and phone number 703-439-2120. Other information associated with a contact may also be included with the contact information, but the potential list of additional contact data elements is too cumbersome to attempt to reproduce in whole here.

The sender security policy information 112 may include directions for the trusted network 116 to permit or restrict the release of contact information 110 for the sender 102 to other trusted network members. For an embodiment, the sender 102 may set separate restriction policies for each individual piece of data in the sender's contact information 110. Some embodiments may also permit the sender 102 to set policies for groups of data, such as a single policy setting for all phone numbers or all e-mail addresses. The policy information 112 may set different permissions and restrictions for different classes of users attempting to access the sender's contact information 110. For instance, a non-member accessing the trusted network 116 through a "public" gateway may receive only the sender's 102 name and a single "respond to" e-mail address, while a trusted member of the network 116 may receive additional information such as phone numbers and physical addresses. A larger subset of the contact information 110 may be made available to trusted members who are also affiliated with the same enterprise/company and an even larger and/or complete subset of the contact information 110 may be made available to individual members that are individually designated by the sender. Some embodiments may limit the individual policy to apply identically for all individuals identified by the sender 102. In other words, the sender 102 may designate a list of individual trusted members that receive an identical large subset of contact information for the sender 102. Other embodiments may permit the sender 102 to set a policy for each individual user so that a first individual user may access a first piece of contact data but not a second piece of contact data, while a second individual user may access the second piece of contact data but not the first piece of contact data. In some embodiments, the individually designated members may be designated to be have access to the sender's contact information more restricted than other classifications.

With the contact information 110 and policy information 112 stored in the contact database 118, a sender 102 that is a trusted user of the trusted network 116 may create an e-mail message using the senders Mail User Agent (MUA) 106 software. The sender 102 may select recipients from the sender's trusted contact list 104 or enter/select other recipients as desired. In some embodiments the sender's trusted contact list 104 may include only contacts that are members of the trusted network 116. In other embodiments the sender's trusted contact list 104 may include both members of the trusted network 116 as well as non-member's of the trusted network 116, i.e., untrusted contacts. When the message is created, the trusted network 116 embeds a "token" in the message that permits the system to identify the sender 102. The token may be embedded in the message in a variety of fashions. In one embodiment, a plug-in may be added to the sender's MUA software 106 that embeds the token in the message. In other embodiments the token may be embedded in the message by the trusted network as the message is transported to the recipient 124. Various embodiments may embed the token in the message via a variety of technologies and at a variety of locations along the message transmission path at the discretion of the system developer, as long as the token is embedded in the message prior to the recipient 124 receiving the message.

The token added to the message may be utilized to identify the sender of the message and, thus, acts as an identifier for the sender 102. The token added to the message may take several forms, as desired by the system developer. An embodiment may include the token as additional text or other data in a header portion, body portion, and/or attachment portion of the message. An embodiment may include the token as an attachment to the message. Other embodiments may include and/or generate the token using other technologies or methods. The contents of the token may be a simple user identification number or string. The contents and/or creation of the token also may be more complex via the use of various available encoding and tracking techniques and technology. For instance, an embodiment may utilize a hash algorithm to create the contents of the token. For some embodiments, multiple hash algorithms may be used to create hash values for different pieces of the message and/or sender contact information. The multiple hash values may further be combined to create a single value consisting of a combination of different hash values. Various embodiments may utilize other tracking and/or identification algorithms.

An audit/token database 120 may be used to store the tokens generated when a message is sent 114. An embodiment may track each message sent through the trusted network 116 in an audit/token database 120. The audit/token database 120 may hold an identifier for each message 114, 122 sent through the system. As part of the identification of the message 114, 122, the system may include sufficient information to identify the sender 102 of the message. An embodiment may also use the audit/token database 120 to hold a simple user identification and/or cross-reference for locating the sender's contact information 110 in the contact database 118. Embodiments may create a separate database for the contact database 118 and the audit/token database 120. Embodiments may also combine the contact database 118 and the audit/token database into a single database containing both sets of data.

For the embodiment illustrated 100, when a sender 102 creates an e-mail message using the sender's MUA 106, the e-mail message 114 is then sent through the trusted network 116 and then sent 122 on to the recipient 124. In the embodiment illustrated, the token is included at the time the sender 102 sends the e-mail message 114. Other embodiments may embed the token in the message at later stages in the message transmission than illustrated in FIG. 1. The recipient 124 receives the e-mail with the token identifying the sender 122 through the recipients MUA software 126. The trusted network 116 extracts the token and utilizes the token to locate a cross-reference to the sender's contact information 110 in the contact database 118 by querying the audit/token database 120 to locate the token from the sent message 114, 122. If the recipient 124 wishes to add the sender 102 to the recipient's trusted contact list 128, the recipient initiates a request 130 to the trusted network 116 to obtain the sender's contact information 110. The contact information request 130 delivered to the trusted network 120 includes the token identifying the sender 102 that was included with the sent message 114, 122. Once a cross-reference for the sender's contact information 110 is located in the audit/token database 120, the trusted network 116 accesses 132 the contact database 118 to locate the sender's contact information 110. After the sender's contact information 110 is located in the contact database 118, the sender's contact information 110 is sent 134 to the recipient 124. The recipient's trusted contact list 128 accepts the sender's contact information 110 that was sent 134 from the contact database 118. As discussed above, the sender's contact information 110 sent 134 to the recipient may be a sub-set of the overall contact information 110 available for the sender 102 per the applicable policy settings 112.

The embodiment illustrated 100 in FIG. 1 describes a system for use with e-mail messages. Other embodiments may be utilized with other electronic communications, including, but not limited to: e-mail, text message, instant message, telephone call, Voice Over Internet Protocol (VOIP) call, voicemail, file transfer, and document archiving. A telephone or VOIP call may also include non-voice messaging protocols such as a facsimile protocol. An embodiment may be created to address an individual type of electronic communications or an embodiment may be created to address multiple electronic communication types within one system. For an electronic communication system to function within an embodiment, the electronic communication message needs to be able to have an identification token attached, embedded, appended, sent with, or associated with the electronic message.

The embodiment illustrated 100 in FIG. 1 describes a system that uses a trusted network 116 as the core of the communications system. Other embodiments may not utilize a traditional trusted network as the basis of the communications system. For instance, an embodiment may comprise a system that includes a token with an e-mail sent over the public Internet where the public Internet acts as the trusted network 116 depicted in FIG. 1. The contact database 118 and audit/token database 120 may be accessed via the public internet such that the sender 102 delivers 108 the sender's contact information 110 to a publically accessible contact database 118. The audit/token database 120 may be a simple cross reference of a token with a unique identification number or string to locate the sender's contact information 110 in the contact database. Without some mechanism to inform the audit/token database 120 of each message and associated token sent, the audit/token database 120 may not be able to include an audit trail to track sent messages. An embodiment may employ a system similar to a trusted network to accept and forward messages to act as a "way station" for sent messages in order to enable a system to track all sent messages. Various embodiments may employ other schemes that permit a system to track messages and extract the identifying token from a message while the message is in route to the recipient 124. Various embodiments may send and receive electronic messages without the need for MUA equivalent software.

When member contact information 110 is kept in a centralized contact database 118, the contact information for a user's contact list 104, 128 may be automatically updated when users on the contact list 104, 128 update contact information at the contact database. Various embodiments may employ different methods to update information in a user's contact list 104, 128 when information is updated at the centralized contact database 118. An embodiment may store all information of a user's contact list 104, 128 locally on the user's computer so that the user will have fast access to the contact list information and so that the contact list information will be available to the user even when a network (i.e., Internet) connection to the centralized contact database 118 is not available. Another embodiment may store all information at the centralized database and store a link at the user's contact list 104, 128 to the centralized contact database 118 so that changes in the centralized contact database 118 are immediately reflected in the user's contact list 104, 128. Various embodiments may employ different buffering schemes to reduce communication bandwidth and/or to permit offline users to have access to data from the last online access to the centralized database 118. An embodiment may maintain a list of all users that have requested contact information for a particular user. When the contact information 110 for a particular user is updated, the centralized contact database 118 may "push" the updates to the contact information 110 to all user contact lists 104, 128 of users contained in the list of users that have requested contact information for the particular user updating contact information. An embodiment may employ the users' contact lists 104, 128 to periodically query or poll the centralized contact database 118 for updated information. The query/poll action may sometimes be referred to as synchronizing the contact list with the centralized database. Even though the process may be called synchronization, updates from a user's contact list 104, 128 to the contact information entered by the particular user 110 may not be permitted in order to ensure that a particular user's contact information 110 may only be changed by the particular user and not other users that have the particular user's contact information 110 in a contact list. The query/poll action may be initiated on a fixed period by employing a clock to query the centralized contact database 118 at fixed times or at fixed intervals. The query action may also be initiated by events, such as turning the computer on or off, opening or closing the messaging (e.g., MUA) software, or in response to a specific user request to update information. Other embodiments may initiate a query action in response to other events, as desired by the system developer. Various embodiments may employ one or more update schemes and update schemes may include other common synchronization and update methods.

An embodiment may also permit a sender 102 to obtain the contact information for a recipient 124 by requesting the recipient's 124 contact information from the centralized contact database 118 based on the message address the sender 102 has entered for the recipient 124. The sender identification token may be used to validate the sender's 102 request for contact information of the recipient 124. Once the sender 102 is validated, the centralized contact database 118 will then deliver the recipient's 124 contact information to the sender's contact list 104 using similar storage, update, security policy, and delivery mechanisms as were used with the recipient's contact list 128. The recipient may also choose to disallow "blind" contact information requests from users sending e-mail to the recipient so that a sending user is unable to obtain the contact information of the recipient unless the recipient sends an e-mail to the sender.

Figure 2:
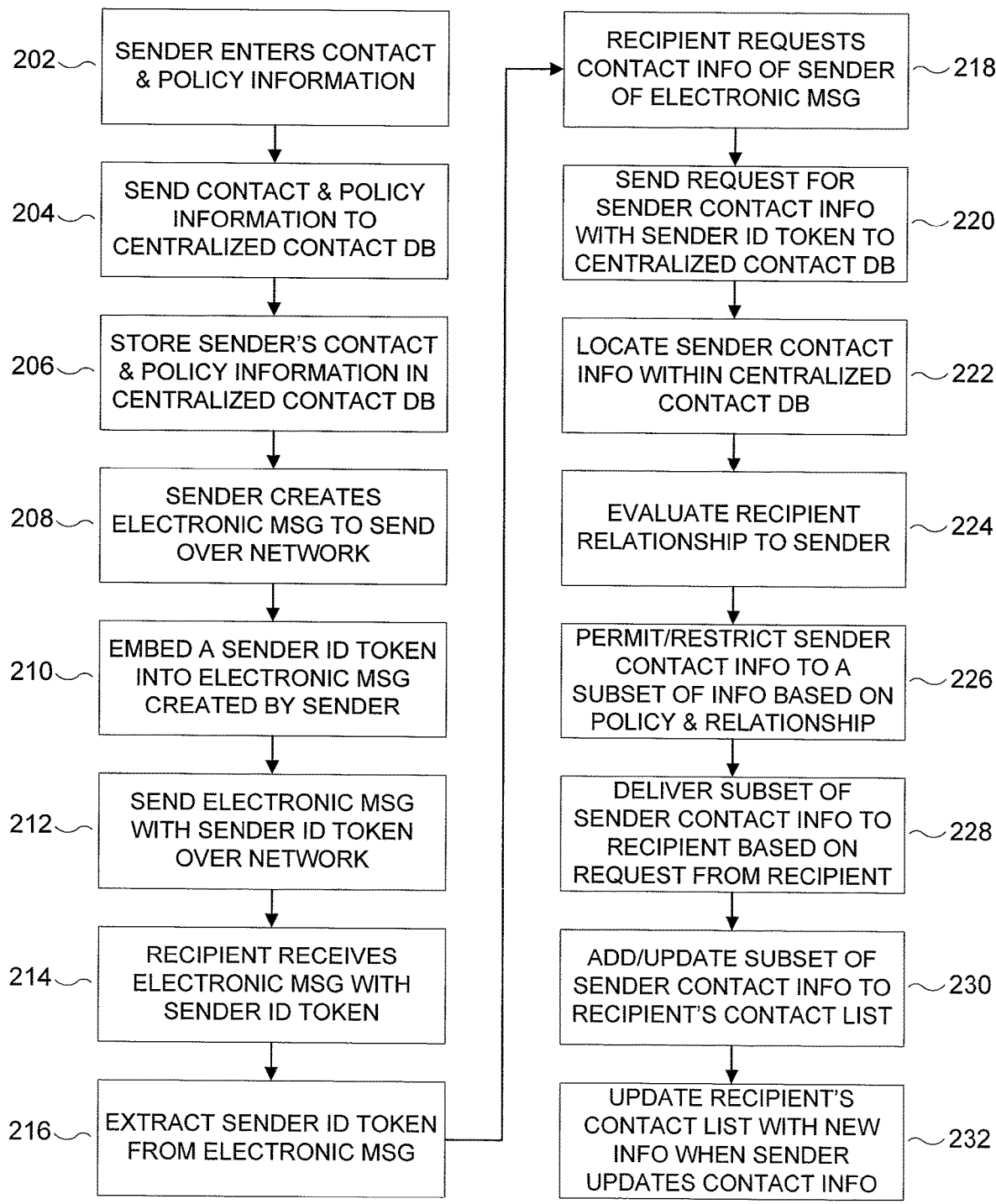
FIG. 2 is a flow chart of the overall process for an embodiment of a centralized contact management system.

FIG. 2 is a flow chart 200 of the overall process for an embodiment of a centralized contact management system. At step 202 a sender enters contact and policy information about the sender (him/her self) into the system. As described above contact information may include a wide variety of data about an individual such as various contact addresses, phone numbers, enterprise/company affiliations, notes, personal data, etc. The policy information includes security and other policies that may be applied to an individual data item in the contact information, or may be applied to a group of data items. The policy information defines the permission or restriction that individual users and or groups/classes of users have to obtain particular data items from the contact information for the sender. The policy and contact information may be entered for all users in the same manner as for the sender. Data entry for the sender is described herein, but data entry for contact and policy information for users other than the sender would be accomplished in a similar fashion as is done for the sender. At step 204, the contact and policy information for the sender is sent to the centralized contact database. At step 206, the sender's contact and policy information is stored in the centralized contact database. At step 208, the sender creates an electronic message to send over the network. At step 210, an embodiment embeds a sender identification token into the electronic message created by the sender. Other embodiments may embed the sender identification token at a different location in the process prior to the recipient receiving the electronic message. At step 212, the electronic message with the sender identification token is sent over the network. Various embodiments may use a trusted network for the network system and/or various embodiments may use a public network, such as the Internet, as the network communications medium. At step 214, the recipient receives the electronic message with the embedded sender identification token. At step 216, an embodiment extracts the sender identification token from the electronic message. At step 218, the recipient requests contact information for the sender of the electronic message. At step 220, a request for the sender contact information along with the sender identification token is sent to the centralized contact database. At step 222, an embodiment locates the sender contact information in the centralized contact database based on the sender identification token sent with the request for contact information. At step 224, an embodiment evaluates the relationship between the recipient and the sender of the electronic message. For instance, an embodiment may determine: is the recipient part of the same enterprise/company, is the recipient accessing the centralized contact database through a public gateway, etc. Some embodiments may not need to evaluate the relationship between the recipient and the sender. For instance, if an embodiment is not going to utilize policies to permit and/or restrict access to data elements, the embodiment may not need to evaluate the relationship between the recipient and sender. At step 226, access to data elements of the sender's contact information is permitted and/or restricted to a subset of the overall sender's contact information. The subset of contact information may include none or all of the available contact information about the sender. At step 228, an embodiment delivers the subset of the sender's contact information to the recipient. The exact content of the subset of the sender's contact information is based on the relationship between the recipient and the sender as well as the details of the sender's policy information. At step 230, an embodiment adds the sender contact information to the recipient's contact list. At step 232, the recipient's contact list is updated with new contact information for the sender when the sender updates the contact information stored in the database. If the sender does not exist in the recipient's contact list, a new entry with the sender's contact information is created. As discussed above with respect to the description of FIG. 1, there are a number of potential update schemes available to update the recipient's contact list when the sender changes his/her contact information stored at the centralized contact database.

Figure 3:
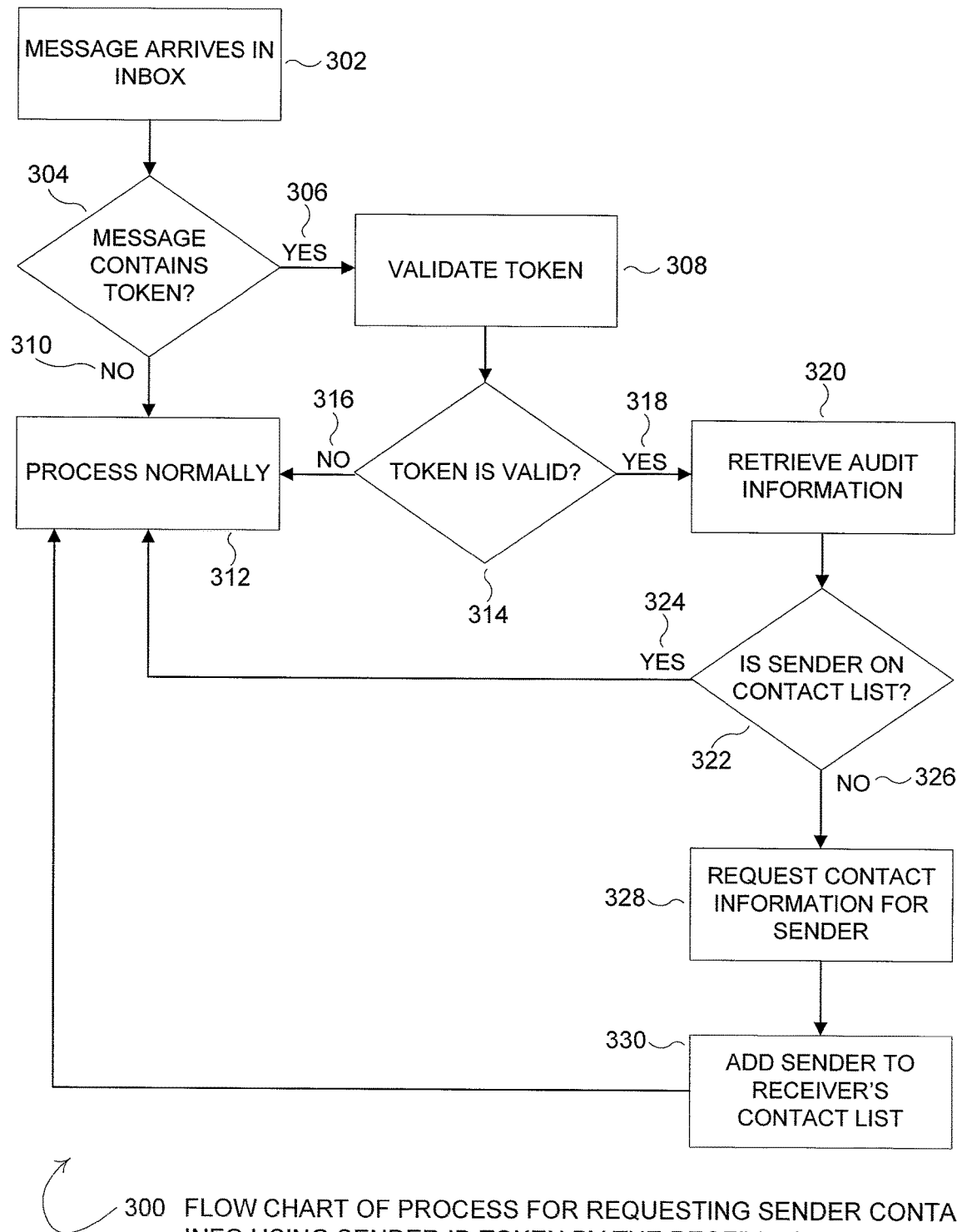
FIG. 3 is a flow chart of the process for an embodiment for requesting contact information for a message sender by a user receiving the message utilizing a sender identification token embedded in the sent message.

FIG. 3 is a flow chart 300 of the process for an embodiment for requesting contact information for a message sender by a user receiving the message utilizing a sender identification token embedded in the sent message. At step 302 an electronic message arrives in the inbox of the recipient. At step 304, an embodiment determines whether the electronic message contains or has a sender identification token embedded in the electronic message. If the electronic message does not include a sender identification token 310, then an embodiment would proceed to step 312 and process the electronic message the same as a normal message that does not contain a token. An embodiment would not offer the recipient the opportunity to add the sender's contact information to the recipient's contact list either automatically or at the recipient's request since the sender identification token is not available to locate the sender's contact information in the centralized database. If the electronic message includes or has embedded the sender identification token 306, then an embodiment validates the token 308 to ensure that the token is the proper form for use with the embodiment. From step 306, an embodiment may then proceed to step 314. At step 314, an embodiment will evaluate the analysis of step 306 and make a decision on which step to proceed to next based on whether the sender identification token is valid. If the sender identification token is not valid 316, then an embodiment may proceed to step 312 and process the electronic message as a normal message that does not contain a token. Similar to the case when the electronic message does not contain a token, an embodiment would not offer the recipient the opportunity to add the sender's contact information to the recipient's contact list either automatically or at the recipient's request since the sender identification token is not valid and would therefore not be usable to locate the sender's contact information in the centralized contact database. If the sender identification token is valid 318, then an embodiment may proceed to step 320. At step 320, an embodiment may retrieve the sender's contact identification based on audit information for the message from the centralized audit/token database. When obtaining the sender's contact identification from the centralized audit/token database, the process may also, inherently, validate that the message was sent by the sender and not a different user. The centralized audit/token database may be a separate database from the centralized contact database. The centralized audit/token database may also be included as a piece of the centralized contact database. The centralized audit/token database contains information that permits an embodiment to locate a user's contact information in the centralized contact database based on the identification token. At step 322, an embodiment determines whether the sender is already on the recipient's contact list based on information retrieved from the centralized contact database using the sender's contact identification found in the audit/token database at step 320. If the sender is already on the recipient's contact list 324, then an embodiment may proceed to step 312 and process the electronic message normally since there is not a need to add the sender to the recipient's contact list. If the sender is not on the recipient's contact list, then an embodiment may request contact information for the sender from the centralized contact database at step 328. An embodiment may automatically request contact information for all senders that do not appear on the recipient's contact list. An embodiment may also wait to receive a specific request from the recipient to retrieve contact information for the sender before attempting to retrieve the sender's contact data from the centralized contact database. At step 330, an embodiment adds the sender's contact information to the recipient's contact list and then proceeds to step 312 to process the electronic as a normal message that does not contain a sender identification token.

Figure 4:
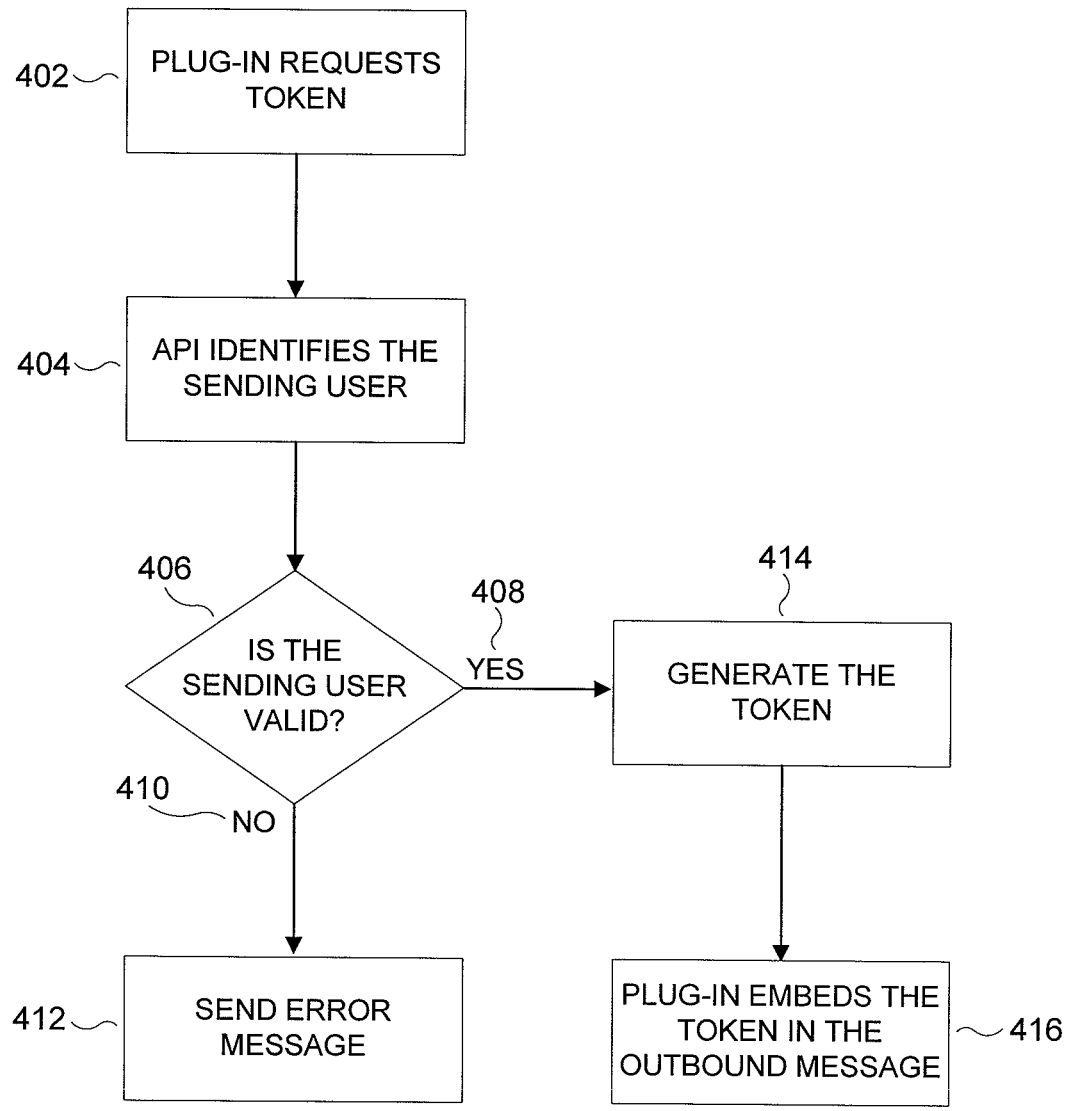
FIG. 4 is a flow chart of the process for an embodiment for embedding a sender identification token in an outbound e-mail.

FIG. 4 is a flow chart 400 of the process for an embodiment for embedding a sender identification token in an outbound e-mail. One embodiment may include the means for generating a token for an electronic message within a "plug-in" for an available electronic message generation platform. For instance, an e-mail message may typically be handled by Mail User Agent (MUA) software. Microsoft® Outlook® is a well known example of MUA software. Many MUA software products permit a "plug-in" to be added to the MUA software and run concurrently with the MUA software. Further, the "plug-in" appears to the MUA user to be a fully integrated function of the MUA software even though the "plug-in" may be added as an additional piece of software provided by a supplier other than the original developer/supplier of the MUA software. Various embodiments may include functionality to handle the sender identification token as part of a "plug-in" for MUA software (or other message handling software) for either the sender or the recipient, or both. Sender identification token handling may also be performed using software external to the normal/generic message handling software such that a "plug-in" is not needed. Various embodiments may combine "plug-in" and external software as needed for each individual user computer system, as well as permitting different architectures for different users. To assist developers an embodiment may create an Application Programming Interface (API) for a developer to interact with in the creation and handling of sender identification tokens, contact information, and policy information. An API implementation will typically hide the intricacies involved in programming a system and permit a developer to perform complex operations to handle the tokens, contact, and policy information in some basic programmatic function and/or subroutine calls.

The flow chart 400 of FIG. 4 illustrates an embodiment that incorporates a "plug-in" and API to handle the sender identification token generation. At step 402, the plug-in requests a token for an outbound electronic message. At step 404, the API identifies the sending user of the electronic message. At step 406, an embodiment determines if the sending user is a valid user of the system. If the sending user is not a valid user of the system 410, an embodiment may proceed to step 412. At step 412, an embodiment sends an error message to the system informing the system that the sending user is not a valid user of the system and cannot embed a sender identification token in an outbound message. If the sending user is a valid user 408, then the system may proceed to step 414. At step 414, an embodiment generates the sender identification token. At step 416, the plug-in for an embodiment embeds the sender identification token into the outbound electronic message.

FIGS. 2-4 describe various embodiments, however, embodiments that change the order of operation, the location where an operation occurs, deletes some operations, and/or adds additional operations may also perform the concepts described with respect to FIGS. 2-4. Thus, other embodiments may not follow the exact order and/or location of the steps described in the flow charts 200, 300, and 400 of FIGS. 2-4.

Figure 5:
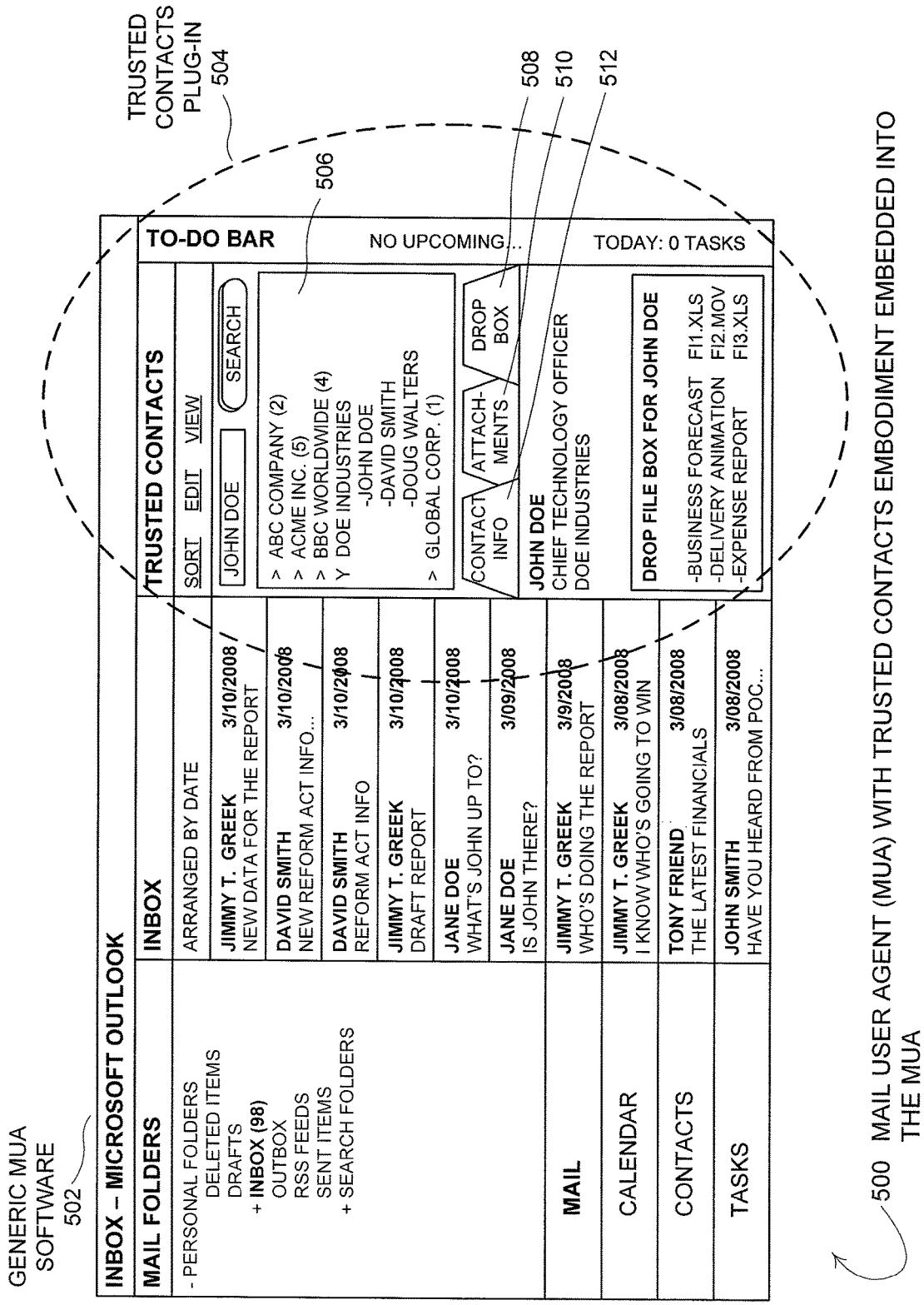
FIG. 5 is a schematic illustration of an embodiment of a plug-in interface for trusted contacts in a third party mail user agent (MUA).

FIG. 5 is a schematic illustration 500 of an embodiment of a plug-in interface 504 for trusted contacts in a third party mail user agent (MUA) 502. An example of available MUA software 502 that supports plug-ins 504 is Microsoft Outlook 502. Other MUA software may also support plug-in technology. The plug-in 504 is incorporated into the MUA software 502 as a "feature" of the MUA software 502 that appears to be part of the MUA software 502 to the user. In the MUA software 502 illustrated 500, the plug-in user interface 504 appears as a panel or sub-window of the MUA software 502. Some potential features for a plug-in interface for trusted contacts 504 include: a search and selection list 506 to locate contacts, a tab for displaying contact information 508, a tab for displaying attachments included with messages from a selected contact 510, and/or a tab for dragging and dropping files for delivery to or access by a selected contact 512. The described features 506-512 do not describe all of the potential features that may be included in a plug-in interface 504. Other features for contact and/or communication management may be incorporated as desired by the system developer. In the embodiment illustrated 500, the plug-in 504 is for trusted contacts. Various embodiments may not require that contacts be trusted, but only that the contacts be supported by the overall system communication system of the embodiment.

Figure 6:
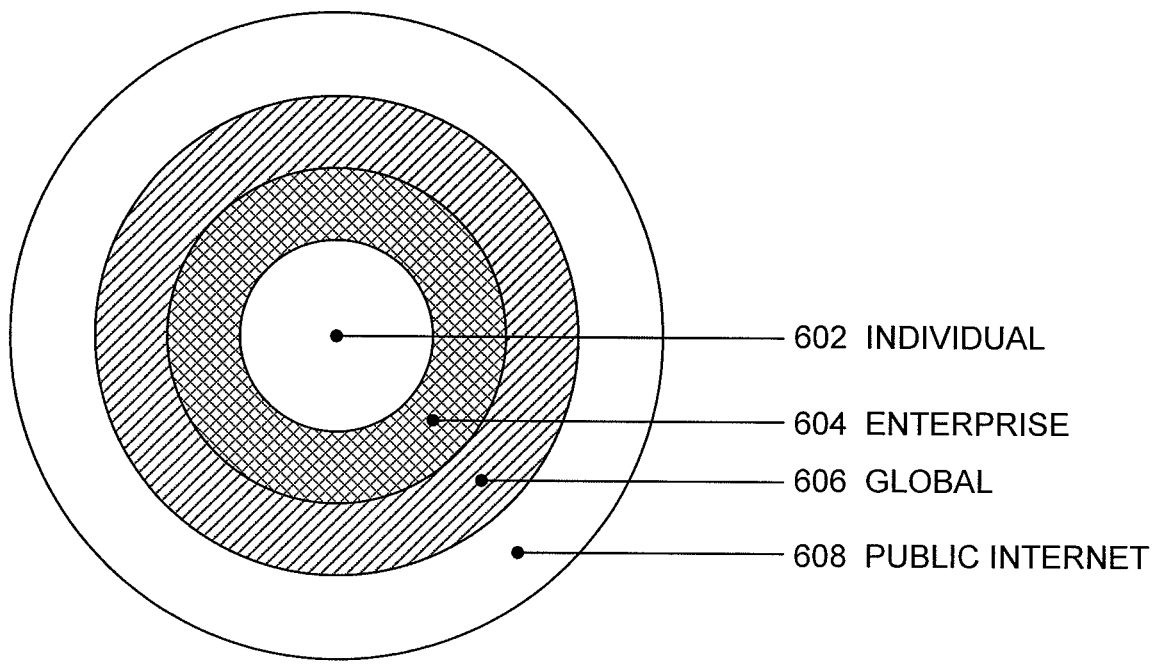
FIG. 6 is a schematic illustration of potential classification of security permission levels for classifying relationships between a message sender and a message receiver of an embodiment.

FIG. 6 is a schematic illustration 600 of potential security permission levels for classifying relationships between a message sender and a message receiver available when creating policies for an embodiment. A user classified with Individual 602 permission may access another user's contact information with the highest degree of access to contact information. As a user's classification progresses from individual 602 out to public internet 608, the user may have access to contact data restricted more at each level. For instance, a user with an enterprise classification 604 may have more access to contact information than a user with a global classification 606, but less access than a user with an individual classification 602. A user with a global classification 606 may have more access to contact information than a user with a public internet classification 608, but less access than a user with an enterprise classification 604. An embodiment may define the individual classification 602 to include individuals specifically identified by the user whose contact information is being accessed. An embodiment may define the enterprise classification 604 to include other users affiliated with the same enterprise/company as the user whose contact information is being accessed. An embodiment may define the global classification 606 to include other users of the system. For instance, for a system that uses a trusted network, the global classification 606 may include other trusted members of the trusted network. An embodiment may define the public internet classification 608 to include all users who access the system via a public gateway. For example, users who access an embodiment with a trusted network system through a "public" gateway to the trusted network and are not members of the trusted network system would likely fall under the public internet classification 608. Other security classifications may be used to replace, add to, or update the security policy classification levels described as desired by a system developer. Further, if desired, an embodiment does not need to create permission levels such that all users will be granted the same level of access to contact information.

An embodiment may also include a "friend-of-a-friend" relationship model to further evaluate the relationship between a sender and a recipient. In the friend-of-a-friend relationship, the level of trust may be adjusted based on whether the sender's contact list and the recipient's contact list have the same contacts. The number of contacts commonly included in both the sender's contact list and the recipient's contact list may enhance the level of trust assigned to the relationship between the sender and recipient. For instance, if both the sender's contact list and the recipient's contact list each have an entry for Joe, the relationship between the sender and the recipient may be enhanced with the friend-of-a-friend relationship. If there a multiple common contacts contained in both the sender's contact list and the recipient's contact list, the friend-of-a-friend relationship may be elevated to a higher level of trust. Another embodiment may also enhance the friend-of-a-friend relationship if the contact list of contacts contained in the sender's contact list contain the recipient as a contact. Similarly, an embodiment may also enhance the friend-of-a-friend relationship if the contact list of contacts contained in the recipient's contact list contain the sender as a contact.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method, comprising:
receiving, from a sending user, sender contact information, security policy information, and an electronic message, the security policy information defining a user relationship;
sending the electronic message including a sender identification token;
receiving a request from a receiving user, the request including the sender identification token;
determining the user relationship between the receiving user and the sending user; and
sending, by a communication system, a subset of the sender contact information, wherein
the subset of the sender contact information is a first subset of the sender contact information of the sending user, if the user relationship indicates the receiving user accesses the communication system via a publicly accessible gateway,
the subset of the sender contact information is a second subset including the first subset and first additional contact information of the sending user, if the user relationship indicates the receiving user is in a same enterprise as the sending user, and
the subset of the sender contact information includes the second subset and second additional contact information of the sending user, if the user relationship indicates the receiving user individually is defined by the sending user.

2. The method of claim 1, wherein the security policy information further defines a user relationship including at least one of the group consisting of: the receiving user globally being part of the communication system, and the receiving user having a friend-of-a-friend in common with the sending user.

3. The method of claim 1, further comprising:
  locating cross-reference information, based on the sender identification token; and
  locating the sender contact information, based on the cross-reference information.

4. The method of claim 1, wherein the sender identification token is created using at least one hash algorithm.

5. The method of claim 1, wherein the sender identification token is embedded into at least one of the group consisting of: a header portion of the electronic message, a body portion of the electronic message, and an attachment portion of the electronic message.

6. The method of claim 1, further comprising:
  pushing an update of the sender contact information to a list of contacts for the receiving user, when the sender contact information is changed at a contact database.

7. The method of claim 1, wherein the electronic message is at least one of the group consisting of: an e-mail, a text message, an instant message, a telephone call, a voice over Internet protocol (VOIP) call, a voicemail, a facsimile, a file transfer, and a document archiving.

8. A communication system, comprising:
  a computer that receives, from a sending user, sender contact information, security policy information, and an electronic message, the security policy information defining a user relationship, wherein
  the computer sends the electronic message including a sender identification token and receives a request from a receiving user, the request including the sender identification token,
  the computer is configured to determine the user relationship between the receiving user and the sending user and to send a subset of the sender contact information,
  the subset of the sender contact information is a first subset of the sender contact information of the sending user, if the user relationship indicates the receiving user accesses the communication system via a publicly accessible gateway,
  the subset of the sender contact information is a second subset including the first subset and first additional contact information of the sending user, if the user relationship indicates the receiving user is in a same enterprise as the sending user, and
  the subset of the sender contact information includes the second subset and second additional contact information of the sending user, if the user relationship indicates the receiving user individually is defined by the sending user.

9. The system of claim 8, wherein the security policy information further defines a user relationship including at least one of the group consisting of: the receiving user globally being part of the communication system, and the receiving user having a friend-of-a-friend in common with the sending user.

10. The system of claim 8, wherein the computer is further configured to locate cross-reference information based on the sender identification token, and the sender contact information is located based on the cross-reference information.

11. The system of claim 8, wherein the sender identification token is created using at least one hash algorithm.

12. The system of claim 8, wherein the sender identification token is embedded into at least one of the group consisting of: a header portion of the electronic message, a body portion of the electronic message, and an attachment portion of the electronic message.

13. The system of claim 8, wherein the computer is further configured to push an update of the sender contact information to a list of contacts for the receiving user, when the sender contact information is changed at a contact database.

14. A computer readable, non-transitory storage medium including instructions that, when executed, cause a computer of a communication system to perform a method comprising:
  receiving, from a sending user, sender contact information, security policy information, and an electronic message, the security policy information defining a user relationship;
  sending the electronic message including a sender identification token;
  receiving a request from a receiving user, the request including the sender identification token;
  determining the user relationship between the receiving user and the sending user; and
  sending, by the communication system, a subset of the sender contact information, wherein
  the subset of the sender contact information is a first subset of the sender contact information of the sending user, if the user relationship indicates the receiving user accesses the communication system via a publicly accessible gateway,
  the subset of the sender contact information is a second subset including the first subset and first additional contact information of the sending user, if the user relationship indicates the receiving user is in a same enterprise as the sending user, and
  the subset of the sender contact information includes the second subset and second additional contact information of the sending user, if the user relationship indicates the receiving user individually is defined by the sending user.

15. The storage medium of claim 14, wherein the security policy information further defines a user relationship including at least one of the group consisting of: the receiving user globally being part of the communication system, and the receiving user having a friend-of-a-friend in common with the sending user.

16. The storage medium of claim 14, the method further comprising:
  locating cross-reference information based on the sender identification token; and
  locating the sender contact information based on the cross-reference information.

17. The storage medium of claim 14, wherein the sender identification token is created using at least one hash algorithm.

18. The storage medium of claim 14, wherein the sender identification token is embedded into at least one of the group consisting of: a header portion of the electronic message, a body portion of the electronic message, and an attachment portion of the electronic message.

19. The storage medium of claim 14, the method further comprising:
  pushing an update of the sender contact information to a list of contacts for the receiving user, when the sender contact information is changed at a contact database.

20. The storage medium of claim 14, wherein the electronic message is at least one of the group consisting of: an e-mail, a text message, an instant message, a telephone call, a voice over Internet protocol (VOIP) call, a voicemail, a facsimile, a file transfer, and a document archiving.

* * * * *